United States Patent
Mattice (10) Patent No.: US 7,241,129 B2
(45) Date of Patent: Jul. 10, 2007

(54) MACHINE FOR COMPRESSION MOLDING CLOSURE SHELLS

(75) Inventor: Daniel L. Mattice, Columbia City, IN (US)

(73) Assignee: Owens-Illinois Closure Inc., Perrysburg, OH (US)

(*) Notice: Subject to any disclaimer, the term of this patent is extended or adjusted under 35 U.S.C. 154(b) by 18 days.

(21) Appl. No.: 11/264,947

(22) Filed: Oct. 31, 2005

(65) Prior Publication Data

US 2007/0098833 A1    May 3, 2007

(51) Int. Cl.
*B29C 43/42* (2006.01)
*B29C 43/50* (2006.01)

(52) U.S. Cl. ............... 425/350; 425/351; 425/438; 425/441; 425/809; 425/DIG. 58

(58) Field of Classification Search ........... 425/350, 425/351, 418, 422, 438, 441, 443, 809, DIG. 58; 249/59; 264/318
See application file for complete search history.

(56) References Cited

U.S. PATENT DOCUMENTS

| | | |
|---|---|---|
| 4,497,765 A | 2/1985 | Wilder et al. |
| 4,776,782 A | 10/1988 | Murayama et al. |
| 5,383,780 A | 1/1995 | McCready et al. |
| 5,421,717 A | 6/1995 | Hynds |
| 5,447,674 A | 9/1995 | Schellenbach |
| 5,565,223 A | 10/1996 | McCready et al. |
| 5,670,100 A | 9/1997 | Ingram |
| 5,776,521 A | 7/1998 | Wright et al. |
| 5,786,079 A | 7/1998 | Alieri |
| 5,798,074 A | 8/1998 | McCready et al. |
| 6,238,202 B1 | 5/2001 | Joseph |
| 6,390,800 B1 | 5/2002 | Brown et al. |
| 6,585,508 B1 | 7/2003 | Zuffa |
| 6,599,115 B2 | 7/2003 | Chalcraft et al. |
| 6,602,065 B1 | 8/2003 | Ingram |
| 6,706,231 B1 | 3/2004 | Ingram |
| 6,733,269 B2 | 5/2004 | Niese |
| 6,736,628 B1 | 5/2004 | Zuffa |
| 2003/0003183 A1 | 1/2003 | Zuffa |
| 2003/0006532 A1 | 1/2003 | Graham et al. |
| 2003/0190385 A1 | 10/2003 | Niese |

FOREIGN PATENT DOCUMENTS

JP    362264923    11/1987

*Primary Examiner*—Yogendra N. Gupta
*Assistant Examiner*—Thu Khanh T. Nguyen (57) ABSTRACT

A machine for compression molding plastic closures includes a support mounted for rotation around an axis, and a plurality of compression molds on the support at angularly spaced positions around the axis. Each of the molds includes a male mold section and a female mold section, at least one of which is movable with respect to the other between a closed position to form a compression mold cavity and an open position spaced from each other. The male mold section includes a mold core and a stripper sleeve surrounding the mold core for movement both rotationally and axially of the mold core. A first screw drive couples the female mold section to the stripper sleeve for rotating the stripper sleeve around the mold core as the at least one mold section is moved between the closed and open positions. A second screw drive couples the stripper sleeve to the support to move the stripper sleeve axially over the mold core as the stripper sleeve is rotated around the core. The stripper sleeve thus rotationally and axially removes a closure shell molded around the core as the at least one mold section is moved with respect to the other from the closed toward the open position.

18 Claims, 12 Drawing Sheets

MACHINE FOR COMPRESSION MOLDING CLOSURE SHELLS

The present disclosure is directed to a machine for compression molding closure shells.

BACKGROUND AND SUMMARY OF THE INVENTIONS

Machines for compression molding closure shells typically include a turret or carousel that rotates around a vertical axis. A plurality of molds around the periphery of the carousel include male and female mold sections that are aligned along vertical axes parallel to the axis of rotation. Cams drive one or both of the mold sections of each pair between an open spaced-apart position, in which a molded closure shell is stripped from the male mold section and a charge of plastic material is placed in the female mold section, and a closed position in which the male and female mold sections are brought together to compression mold the charge to form the closure shell. U.S. Patents that illustrate machines of this type for compression molding plastic closure shells include U.S. Pat. Nos. 5,670,100, 5,989,007, 6,074,583 and 6,478,568.

When compression molding closure shells in machines of this type, the shell typically is stripped from the male mold core by means of a sleeve that engages the edge of the closure skirt. The sleeve and/or the core are moved axially relative to each other so that the closure skirt effectively is pushed off of the core. This type of stripping action is satisfactory for many applications, but is not satisfactory for applications that require precise control and/or contouring of the internal thread segments on the closure shell, such as retort applications in which the closure must remain on the container finish under high temperature and pressure conditions. In applications of this type, the closure must be stripped from the core by rotating the closure off of the core. U.S. Pat. No. 6,706,231 discloses a vertical-axis carousel-type machine for compression molding closure shells, in which a cam-operated ball screw arrangement rotates the mold core to unthread the mold core from the closure shell and strip the shell from the core.

The present disclosure involves a number of aspects or inventions, which may be implemented separately from or in combination with each other.

A machine for compression molding plastic closures in accordance with one aspect of the present disclosure includes a support mounted for rotation around an axis, and a plurality of compression molds on the support at angularly spaced positions around the axis. Each of the molds includes a male mold section and a female mold section, at least one of which is movable with respect to the other between a closed position to form a compression mold cavity and an open position spaced from each other. The male mold section includes a mold core and a stripper sleeve surrounding the mold core for movement both rotationally and axially of the mold core. A first screw drive couples the female mold section to the stripper sleeve for rotating the stripper sleeve around the mold core as the at least one mold section is moved between the closed and open positions. A second screw drive couples the stripper sleeve to the support to move the stripper sleeve axially over the mold core as the stripper sleeve is rotated around the core. The stripper sleeve thus rotationally and axially removes a closure shell molded around the core as the at least one mold section is moved with respect to the other from the closed toward the open position. The support may comprise a horizontal wheel as in a carousel-type compression molding machine or a vertical wheel that is rotatable around a horizontal axis. The at least one mold section may be cam driven between the open and closed positions as a function of rotation of the support around its axis.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
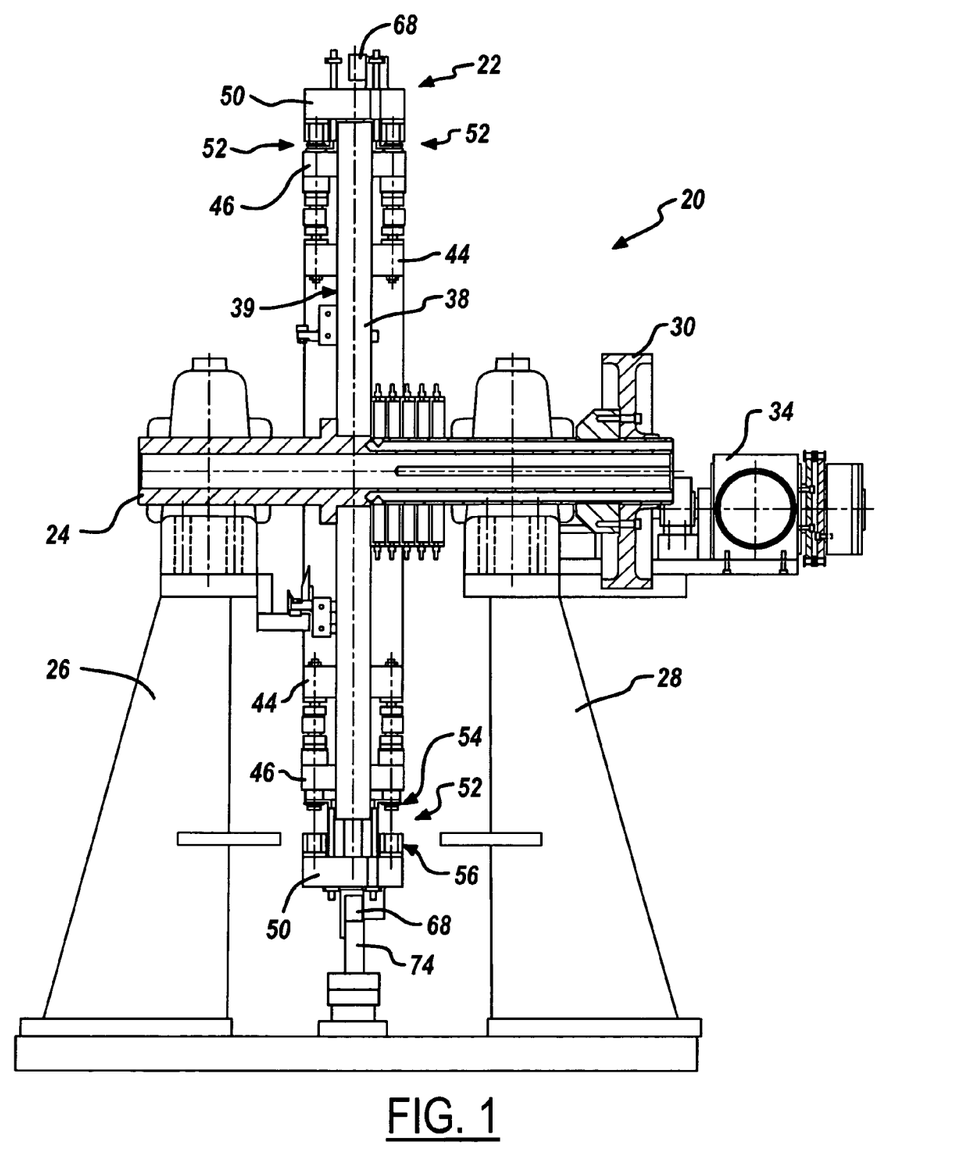
FIG. 1 is a front elevational view of a compression molding machine in accordance with one embodiment of the present disclosure.
Figure 2:
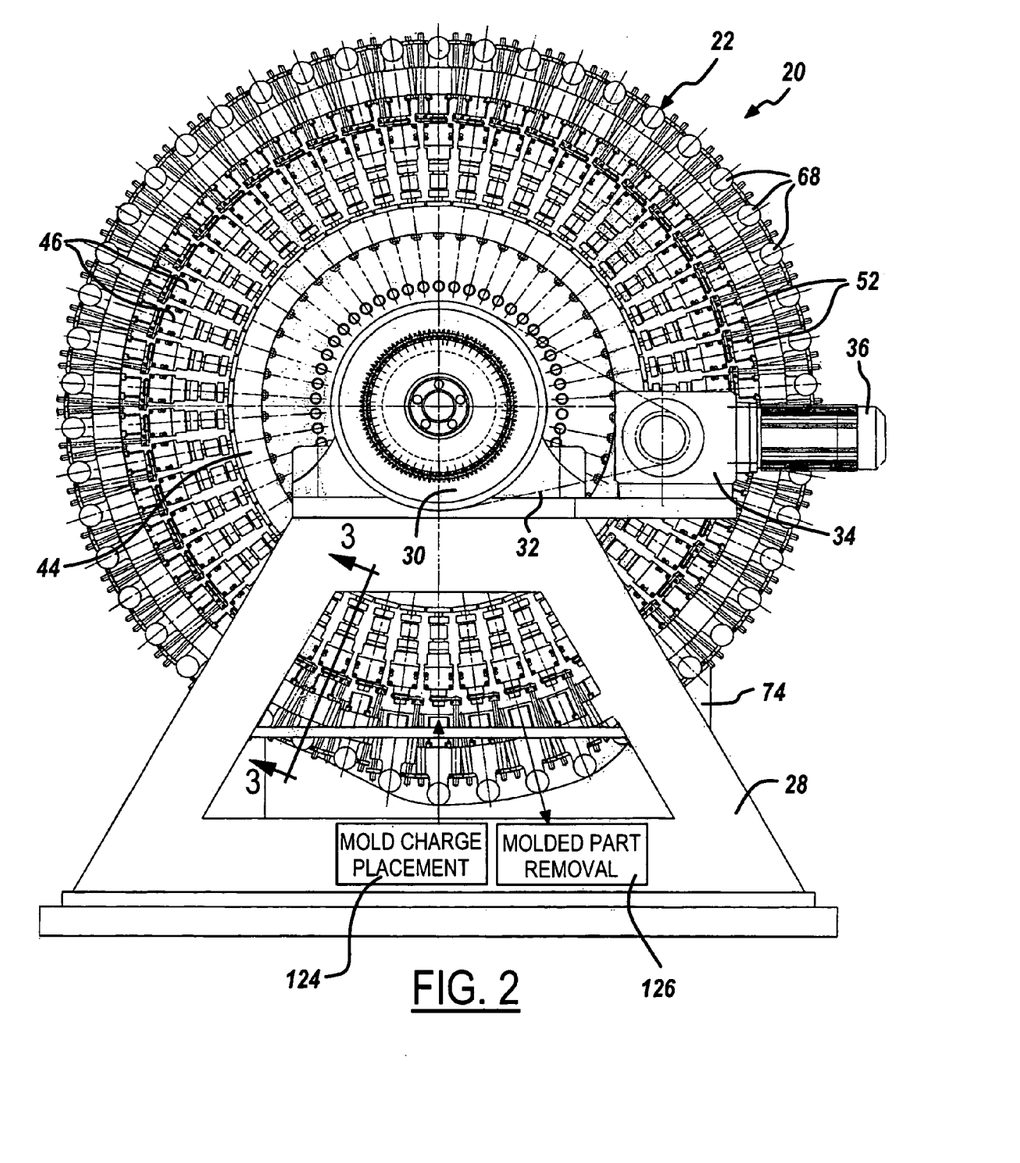
FIG. 2 is a side elevational view of the compression molding machine illustrated in FIG. 1.
Figure 3A:
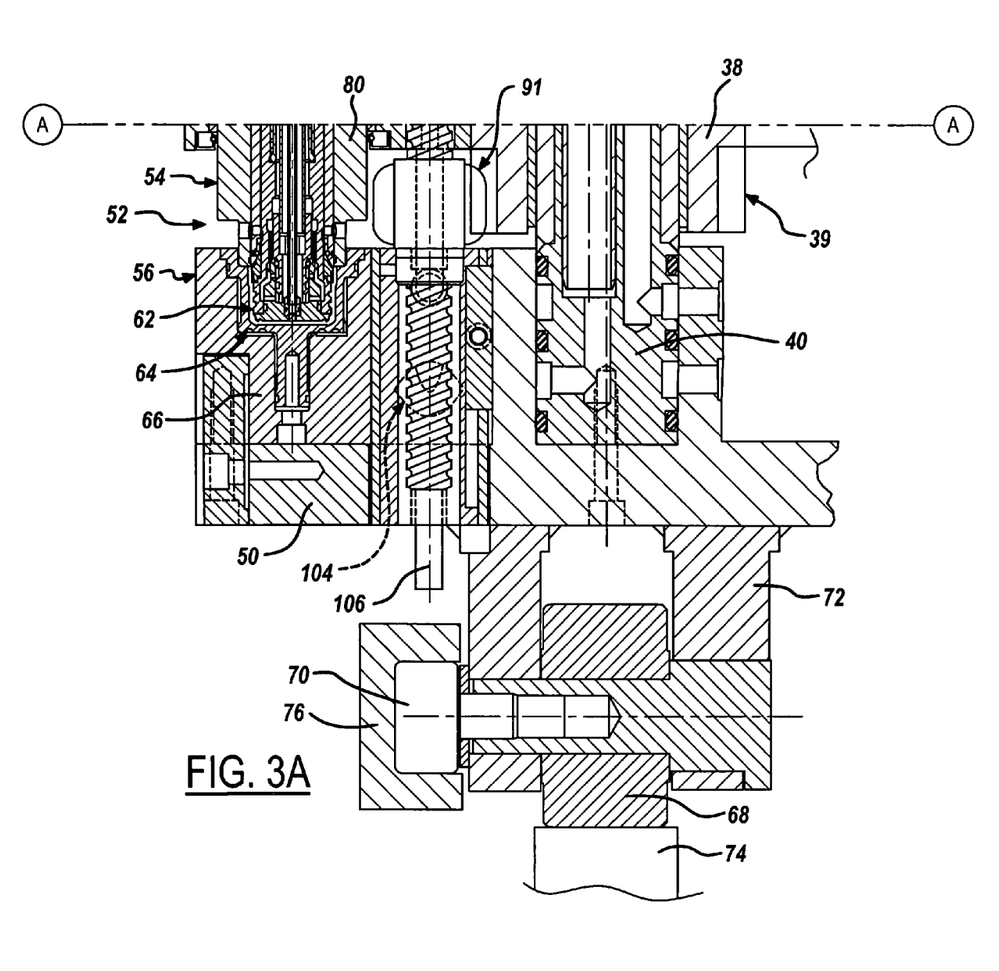
FIGS. 3A–3D together form a sectional view taken substantially along the line 3—3 in FIG. 2.
Figure 3B:
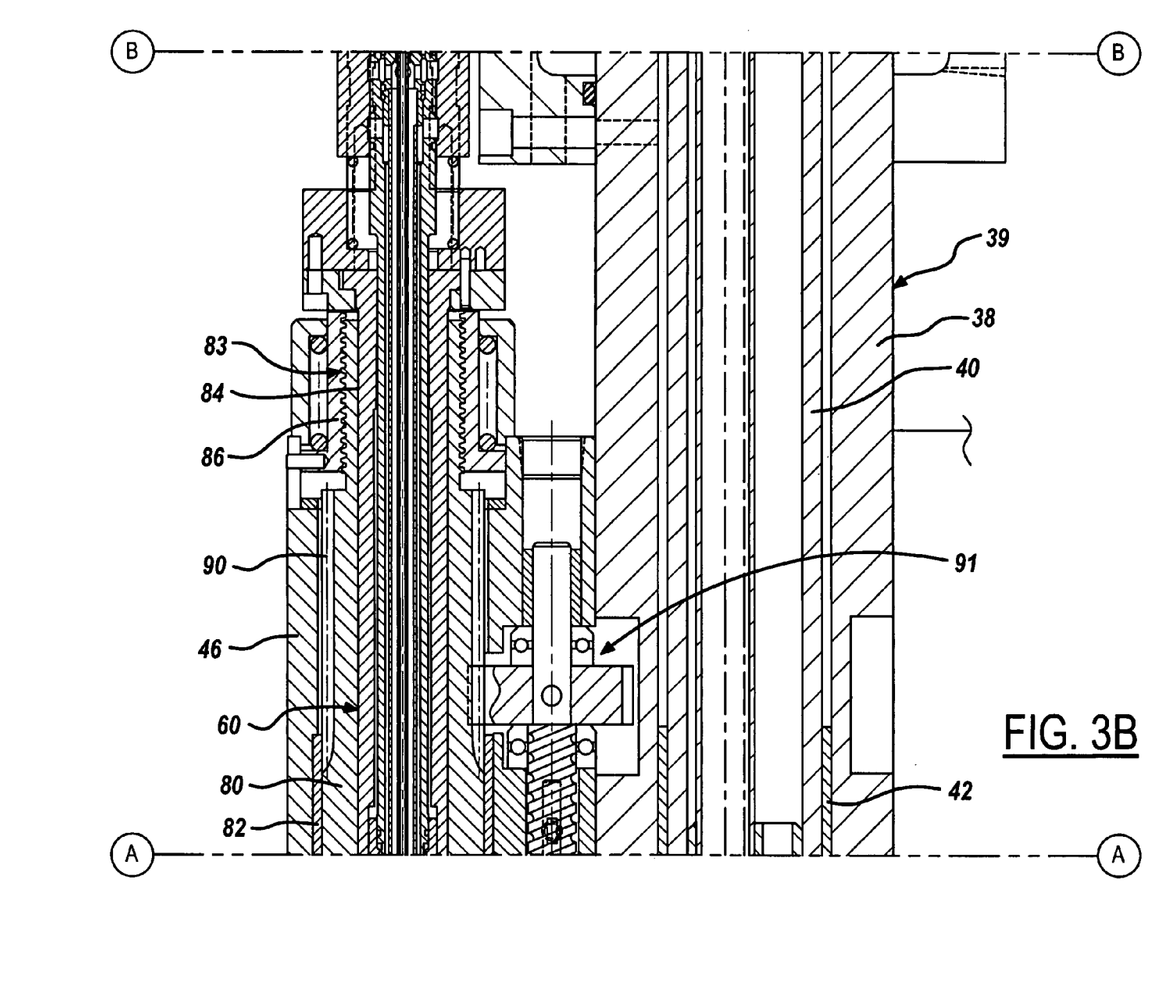
Figure 3C:
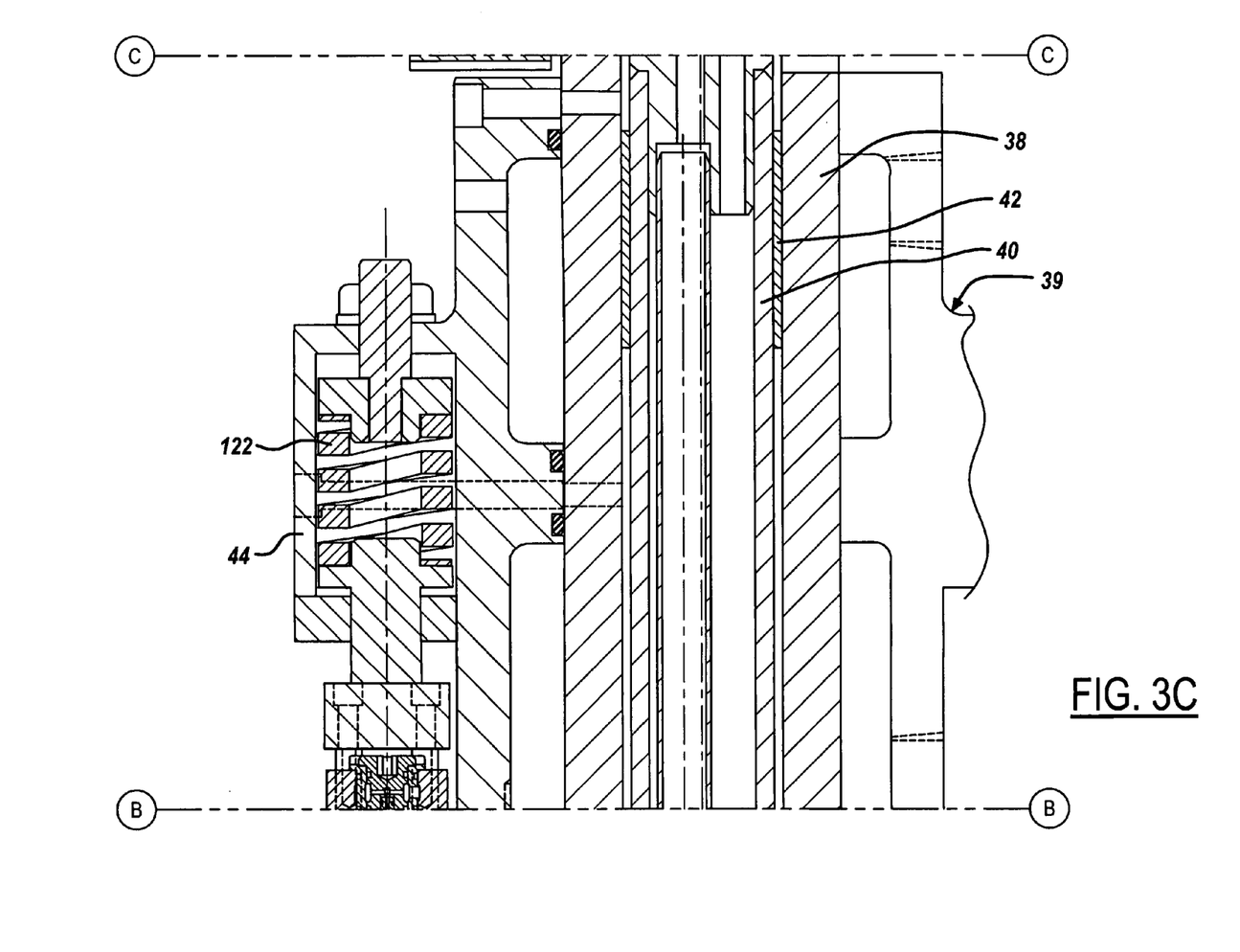
Figure 3D:
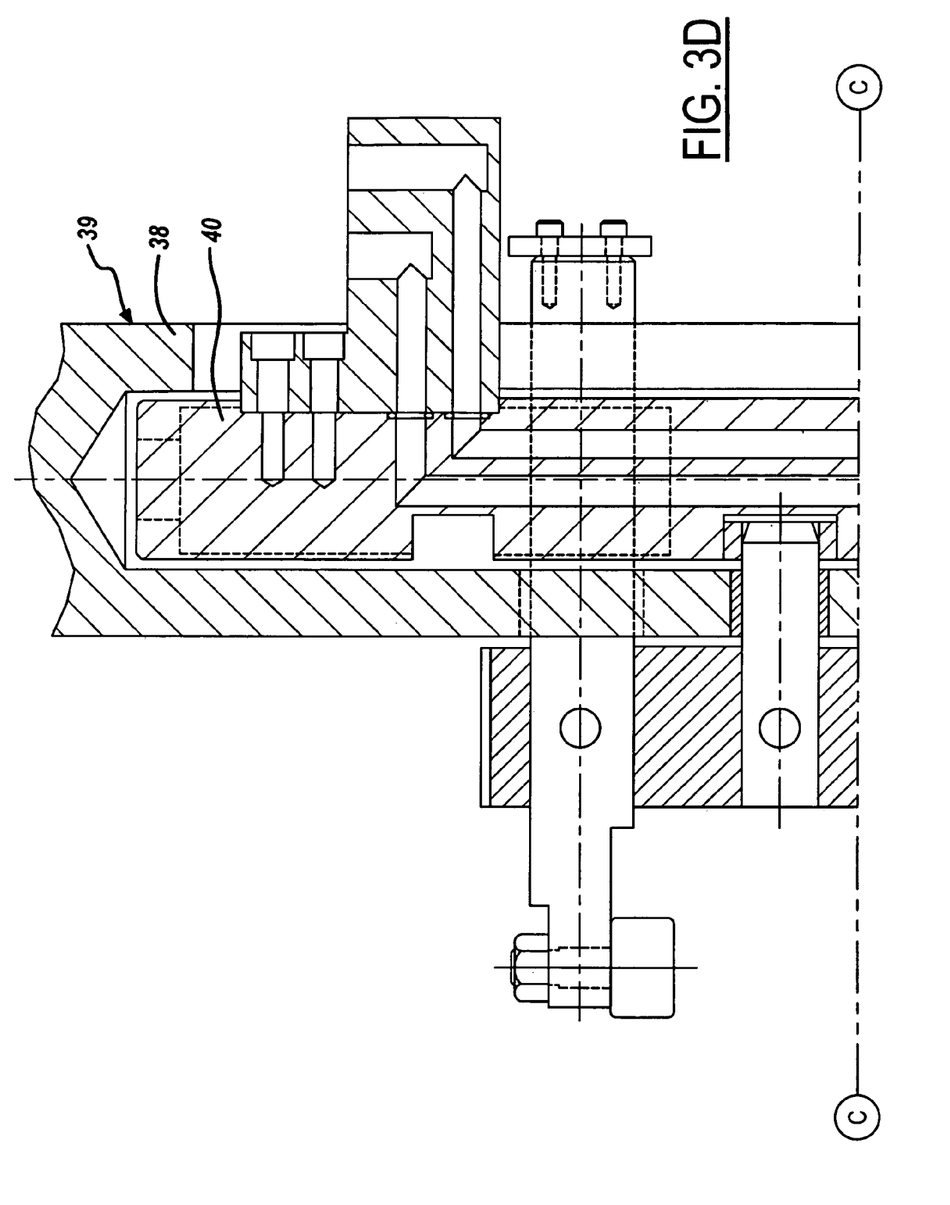

FIGS. 1–2 illustrate a machine 20 for compression molding plastic closure shells in accordance with one embodiment of the present disclosure. Machine 20 includes a wheel 22 mounted on a shaft 24 between spaced supports 26, 28. Shaft 24 is coupled by a pulley 30, a belt 32 (FIG. 2) and a gearbox 34 to a motor 36 for rotating shaft 24 and wheel 22 around a horizontal axis. Wheel 22 includes a hub (which may be part of shaft 24) and a support 39 extending radially from the hub. Support 39 may comprise a solid disk or the like, or more preferably a plurality of angularly spaced radially extending support spokes 38. Each support spoke 38 preferably is hollow at its outer end, as best seen in FIGS. 3A–3D. A rod 40 is slidably supported, such as by sleeve bearings 42, within the hollow outer end of each spoke 38. A crossbar 50 is coupled to the outer end of each rod 40, so that the combination of rod 40 and bar 50 preferably is generally T-shaped as viewed from the tangential direction in FIG. 3A. A plurality of radially spaced external supports 44, 46 are provided on spokes 38, preferably on each axial side of each spoke. The radially inner supports 44 on the series of spokes preferably form circumferentially continuous support rings, as best seen in FIG. 2. Radially outer supports 46 preferably are circumferentially spaced from each other. A plurality of angularly spaced molds 52 are disposed around the periphery of wheel 22, preferably but not necessarily on both sides of the wheel. Each mold 52 is disposed between supports 44, 46 on the associated spoke 38 and an end of crossbar 50 on rod 40. All molds 52 preferably are identical. To the extent thus far described, machine 20 is similar to that disclosed in copending U.S. application 11/109,374, currently pending entitled "Compression Molding Machine," the disclosure of which is incorporated herein by reference.

Each mold 52 preferably includes a radially inner first mold segment or section 54 and a second mold segment or section 56 in radial outward alignment with the associated first mold section 54. (Unless otherwise indicated, directional words such as "radial," "tangential," "inner" and "outer" are employed by way of description and not limitation with respect to the axis of rotation of wheel 22.) In the preferred embodiments of the disclosure, to the extent embodied in a vertical wheel machine, the radially inner first mold section 54 is a male mold section and the radially outer second mold section 56 is a female mold section, although these mold sections could be reversed in accordance with the broadest principles of the disclosure. Male mold section 54 includes a mold core 60 having a core tip 62 contoured to form the desired inside geometry of the closure shell. Likewise, female mold section 56 includes a cavity insert 64 mounted by a support block 66 on crossbar 50. Insert 64 has a geometry to form the desired outer contour of the closure shell. Cam rollers 68, 70 are mounted on supports 72 that extend from crossbar 50 for engagement with cams 74, 76 to move female mold sections 56 radially inwardly and outwardly with respect to male mold sections 54 as a function of rotation of wheel 22 around its axis. To the extent thus far described, the constructions of the male and female mold sections, and the mechanism for opening and closing the mold sections, are similar to those disclosed in the above-references copending U.S. application.

Male mold section 54 also includes a stripper sleeve 80 that surrounds mold core 60. Stripper sleeve 80 is movable both axially with respect to mold core 60 (i.e., in the direction of the axis of the mold core) and circumferentially or rotationally around the outer surface of the mold core. Stripper sleeve 80 is carried within support 46 by a sleeve bearing 82 near the radially inner end of sleeve 80 (with respect to the axis of wheel rotation). External threads near the inner end 84 of the stripper sleeve engage an internally threaded collar 86 carried by support 46 to form a screw drive 83, as will be described. At the radially outer end of stripper sleeve 80, there are provided a circumferential series of teeth 88 (FIG. 10) to engage the axial edge of a molded closure shell skirt, as will be described. Intermediate the ends of the stripper sleeve, there are provided a circumferential series of gear teeth 90 that extend axially of the stripper sleeve entirely around the outer surface of the stripper sleeve and for a substantial portion of the length of the stripper sleeve. That is, gear teeth 90 are in the form of a circumferentially spaced array of axially extending splines around the outer surface of stripper sleeve 80, preferably between the mid portion of the stripper sleeve and sleeve end 84.

A screw drive 91 (see FIG. 4) couples female mold section 56 to stripper sleeve 80. Screw drive 91 includes a ball screw 92 having a ball nut 94 and a ball screw shaft 96. Ball nut 94 is coupled to a ball screw driver 98 that is carried by mold section 56 for limited movement in the direction of the axis of shaft 96, which is parallel to but offset from the axis of mold 52. The opposing end of ball screw shaft 96 (the radially inner end with respect to the axis of rotation of wheel 22) is coupled to a drive gear 100 that is meshed with gear teeth 90 on stripper sleeve 80. Ball screw shaft 96 preferably is carried by rotary bearings 102 on support 46. Ball screw driver 98 is operatively coupled to mold section 56 by means of a lost motion coupling 104 (see FIG. 4). Lost motion coupling 104 includes a rod 106 connected at a radially inner end to support 46 and slidable in a bearing 108 carried by mold section 56. Rod 106 has a slot 110 with an angulated cam surface 112 at its radially outer end. Ball screw driver 98 is slidably carried within a sleeve 114 on mold section 56. Driver 98 has a laterally extending detent pocket 116 that is opposed to slot 110 in rod 106. A detent ball 118 is captured in an opening 120 in sleeve 114 between rod 106 and driver 98.

In operation, as wheel 22 rotates in a clockwise direction in FIG. 2, mold charges of plastic material are placed by mold charge placement mechanism 124 within inserts 64 of mold sections 56 in sequence. During continued rotation of the wheel, the mold sections are closed by cam 74 and the mold charge is compression molded to form a closure shell. When mold 52 re-engages cam 76 (FIG. 3A) from the clockwise direction (FIG. 2), mold section 56 is pulled away from mold section 54 to open the mold, and the molded shell is stripped from the mold core and removed by a molded part removal device 126 (FIG. 2). Stripping of the molded closure shell from the mold core is accomplished by simultaneously rotating the molded closure while axially pushing on the molded closure, using stripper sleeve 80, as will now be described.

Figure 4:
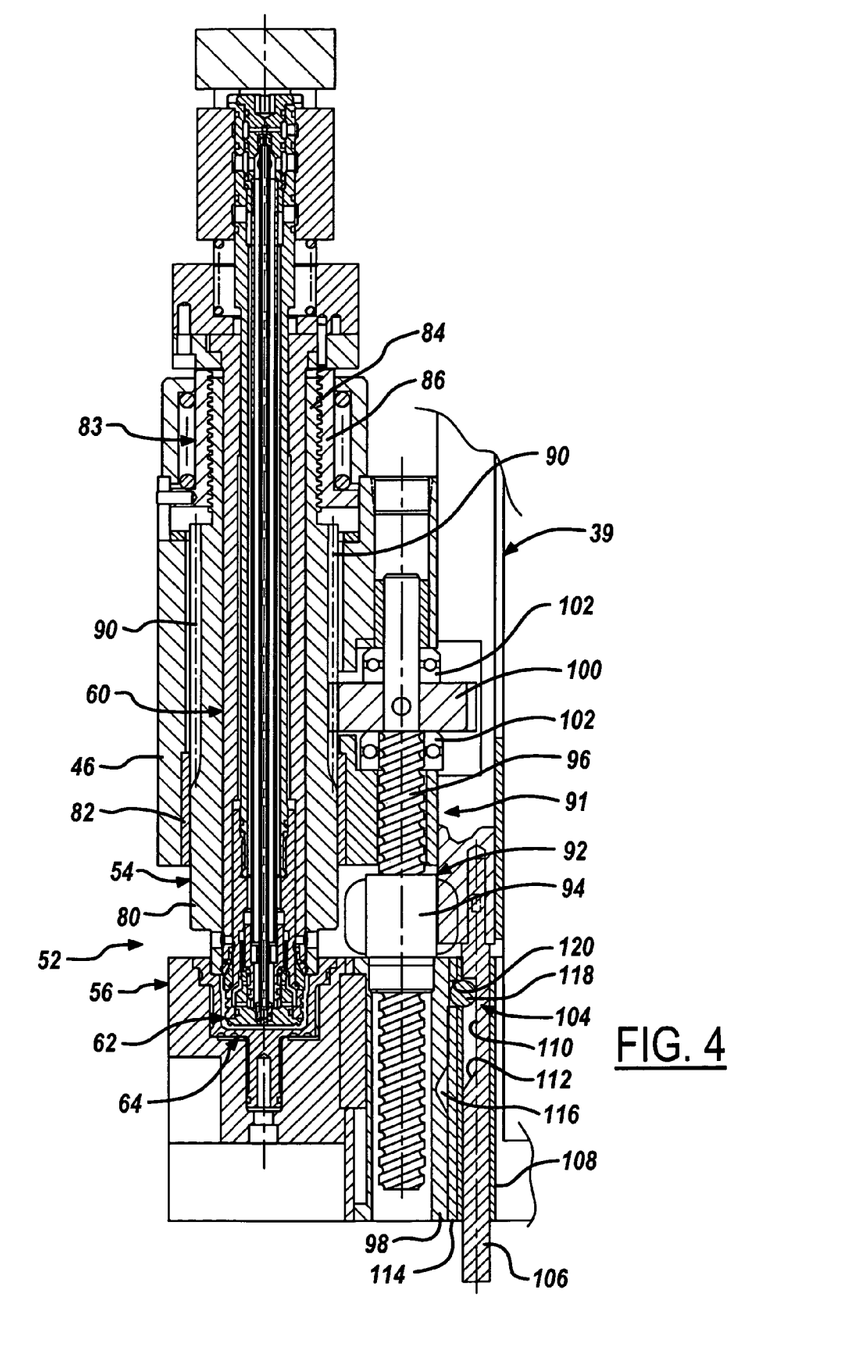
FIGS. 4–9 are fragmentary sectional views that illustrate one mold of the machine of FIGS. 1–2 in sequential stages of operation.
Figure 5:
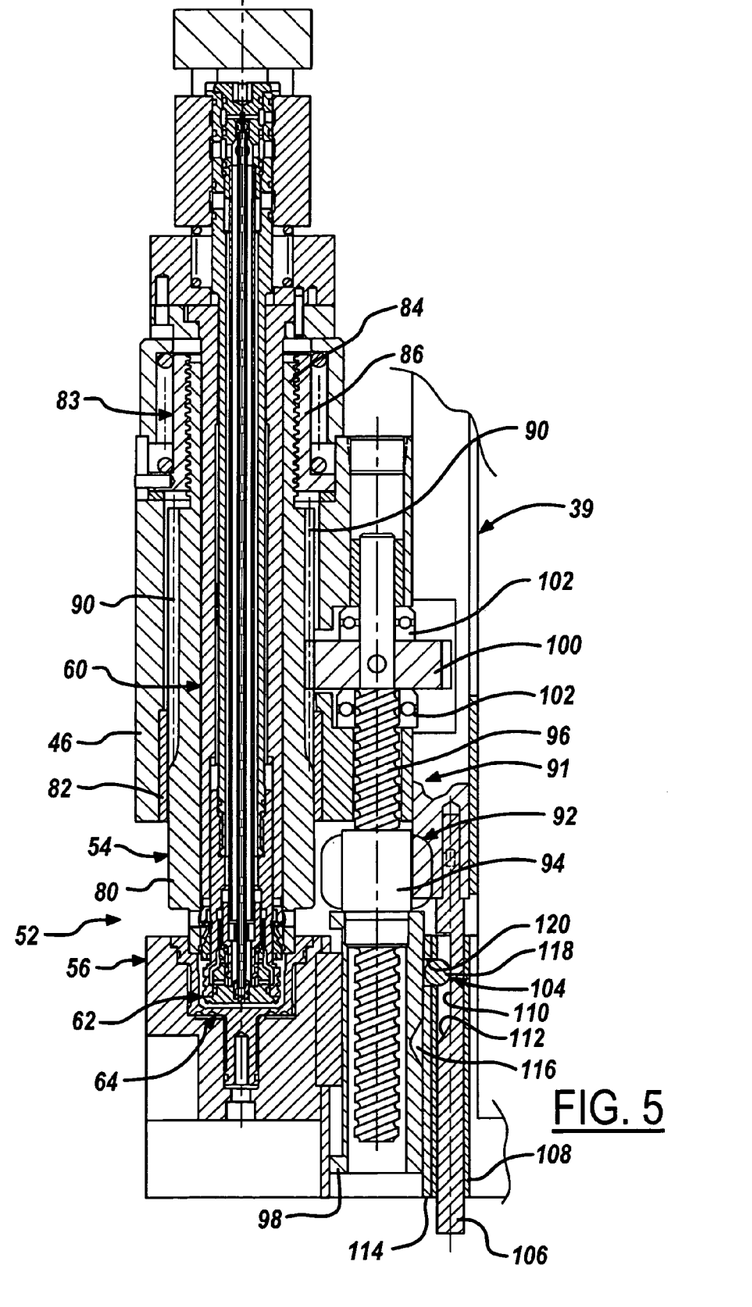
Figure 6:
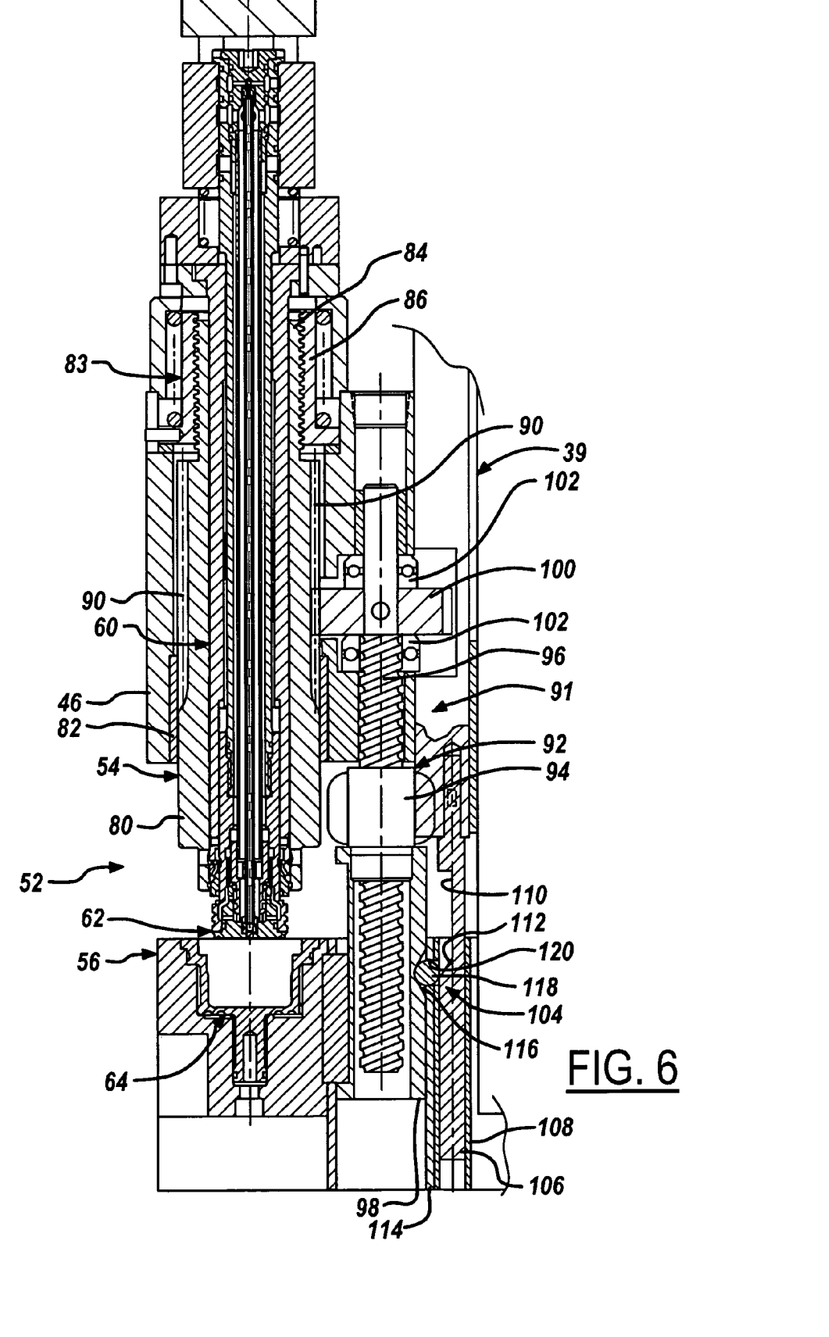
Figure 7:
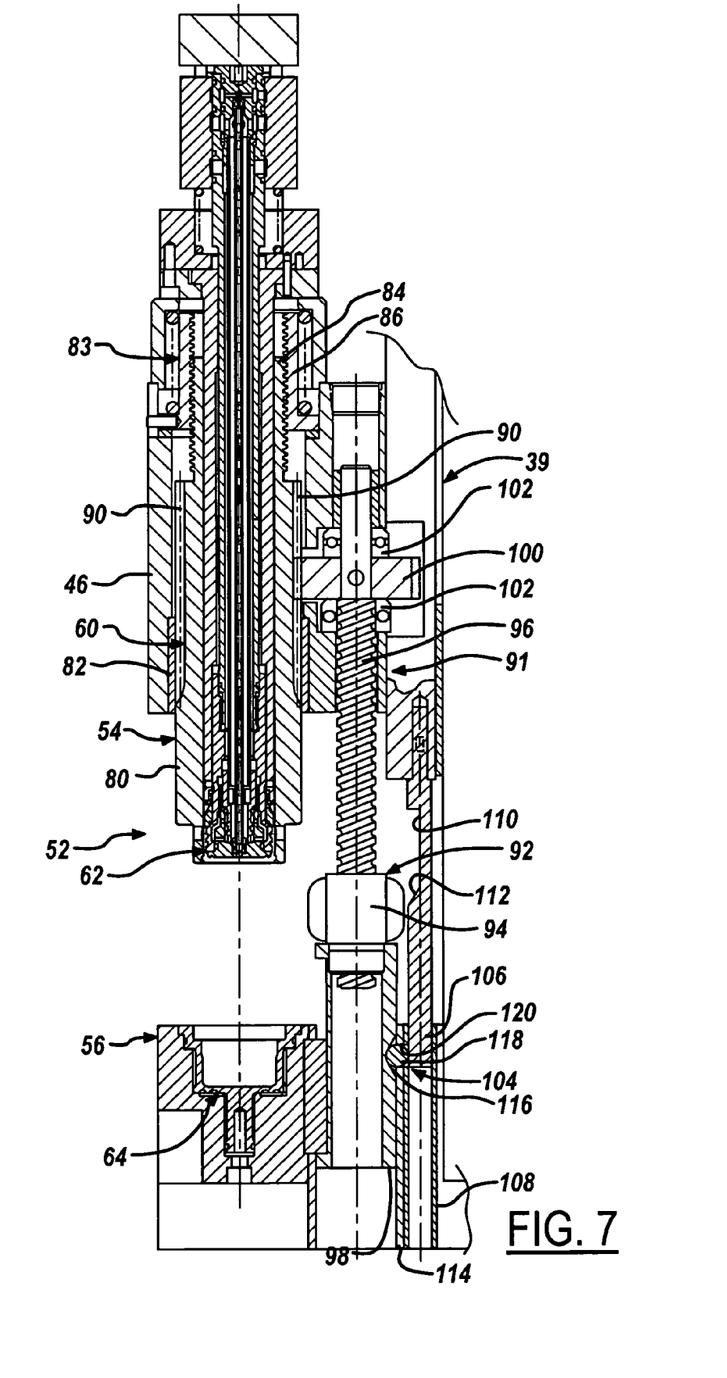
Figure 8:
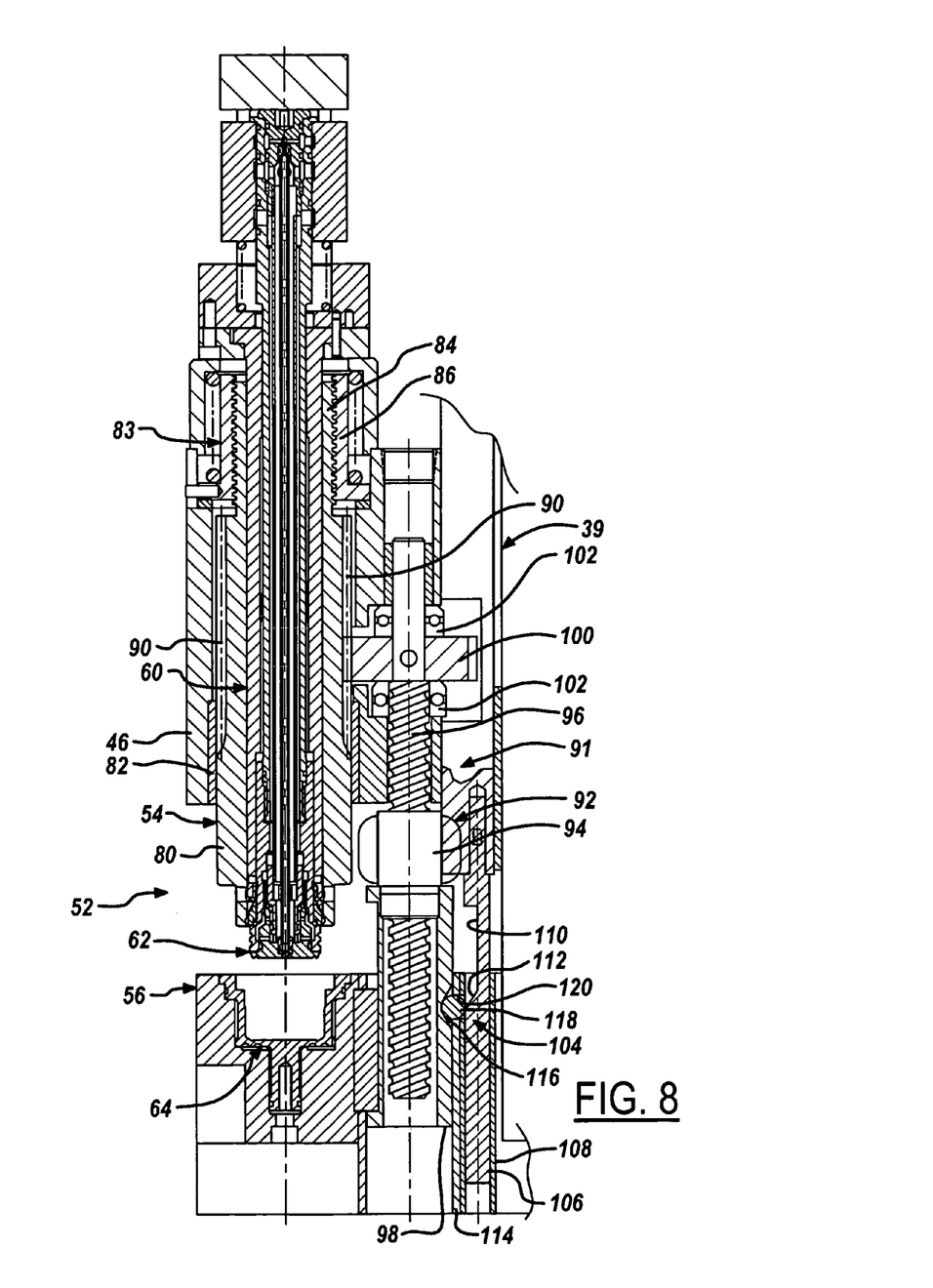
Figures 9, 10:
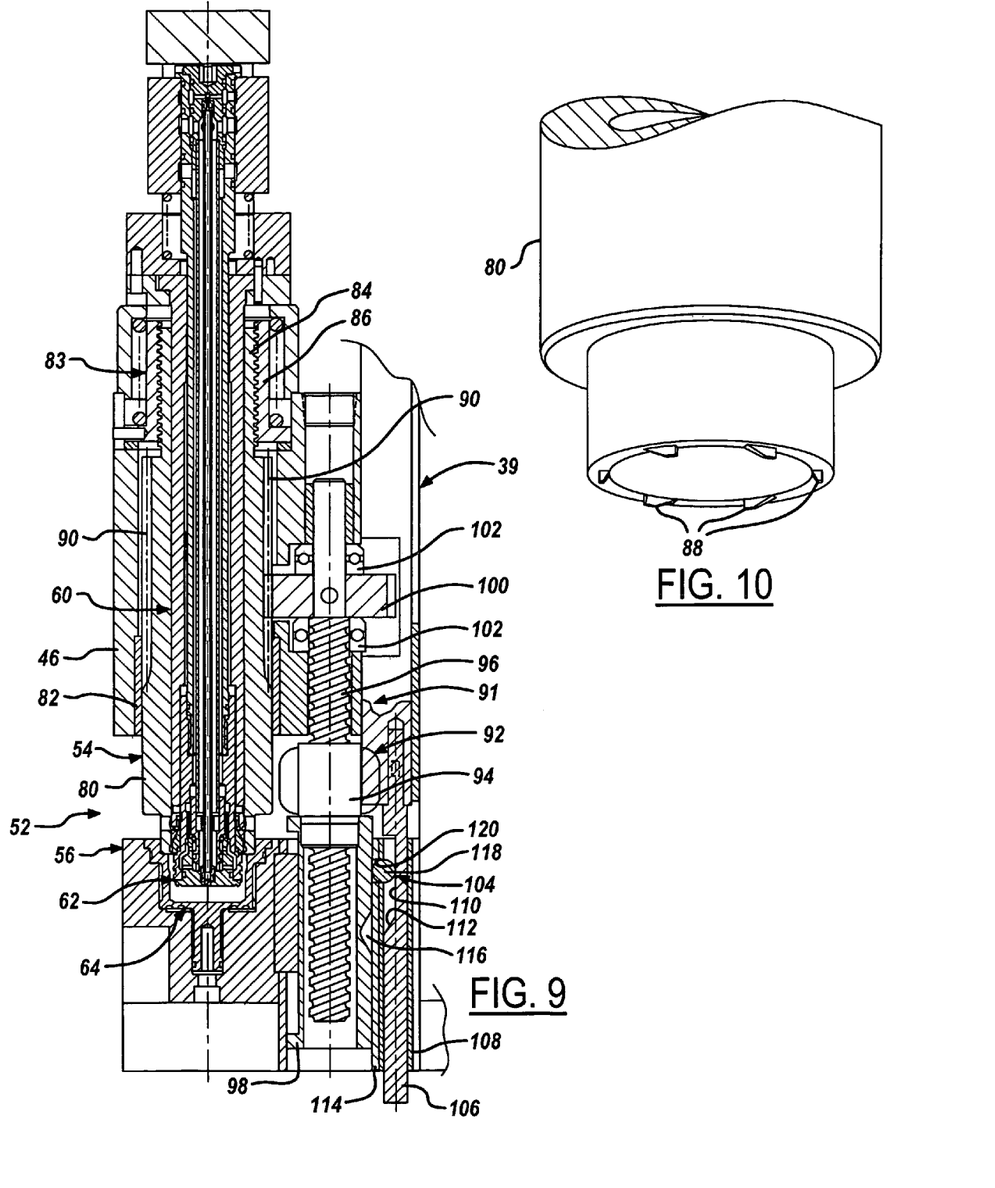
FIG. 10 is an end view of the stripper sleeve in the machine of FIGS. 1–9.

FIGS. 4–9 illustrate motions at one mold 52 from the fully closed position of FIG. 4, in which the closure shell is molded, through the positions of FIGS. 5 and 6 to the position of FIG. 7, in which the mold is fully open, through the position of FIG. 8 to the position of FIG. 9 in which the mold is almost fully closed. Between the positions of FIGS. 4 and 5, mold section 56 is moved downwardly with respect to support 39, so that ball 118 begins to be pulled downwardly within slot 110. ("Downwardly" in FIGS. 4–9 would be radially outwardly in the preferred but exemplary vertical wheel construction of FIGS. 1–2.) However, the initial motion of the mold sections is accommodated by core back-up springs 122 (FIG. 3C), so the mold cavity does not yet begin to open. Further downward motion of mold section 56 (FIG. 5 to FIG. 6) begins to open the mold cavity, and brings ball 118 into engagement with cam surface 112 of slot 110. Ball 118 is cammed into detent pocket 116 of ball screw driver 98 (FIG. 6), so that further downward motion of mold section 56 (FIG. 6 to FIG. 7) moves driver 98 downwardly with respect to support 39.

Such downward motion of driver 98, and ball nut 94 carried by driver 98, rotates shaft 96 and gear 100 so as to rotate stripper sleeve 80 around core 60. Rotation of stripper sleeve 80 around core 60 also functions through screw drive 83 to move stripper sleeve 80 axially over core 60. Teeth 88 (FIG. 10) on stripper sleeve 80 engage the free edge of the closure skirt, so that the axial and rotational movement of the stripper sleeve over the core unthreads the molded closure skirt from core tip 62. The pitch of screw drive 83 is the same as the pitch of the thread segments on the closure skirt. The thread segments and any other features on the inside of the closure skirt are protected from damage or distortion that might otherwise occur if the closure shell were merely pushed axially off of the mold core. When the closure shell has been unthreaded from the mold core, it is caught and removed by device 126 (FIG. 2), which can be of any suitable type. After a mold charge is placed in mold section 56, section 56 is moved from the fully open position of FIG. 7 through the positions of FIGS. 8 and 9 to the fully closed position of FIG. 4. As mold section 56 passes the position of FIG. 8, ball 118 is pushed back into slot 110 of rod 106. Upward motion of driver 98 rotates shaft 96, gear 110 and stripper sleeve 80 so that the stripper sleeve is returned to its initial position when the mold is closed. Teeth 90 on stripper sleeve 80 are in the form of elongated splines to allow for axial movement of the stripper sleeve during the stripping operation (FIG. 6 to FIG. 7).

There thus has been disclosed a compression molding machine that fully satisfies all of the objects and aims previously set forth. The machine has been disclosed in conjunction with a presently preferred embodiment, and a number of modifications and variations have been discussed.

Other modifications and variations readily will suggest themselves to persons of ordinary skill in the art in view of the foregoing discussion. For example, although the machine has been disclosed in conjunction with a vertical wheel machine, it will be understood that the disclosure in its broadest principles would be equally applicable in vertical-axis carousel-type machines. In such a machine, molds 52 would be mounted on axes parallel to the carousel axis, and mold segments 56 and/or mold segments 54 would be moved by cams or other suitable means disposed around the periphery of the carousel support. Furthermore, although the female mold section moves in the disclosed embodiment, the disclosure could as readily be implemented in a machine in which the male mold section moves, or in which both the male and female mold sections move, such as by cam-driven movement as in above-noted U.S. Pat. No. 6,706,231. The disclosure is intended to embrace all such modifications and variations as fall within the spirit and broad scope of the appended claims.

The invention claimed is:

1. A machine for compression molding plastic closures, which includes:
    a support for rotation around an axis,
    a plurality of compression molds on said support at angularly spaced positions around said axis,
    each of said molds including a male mold section and a female mold section, at least one mold section of each mold being movable with respect to the other mold section between a closed position to form a compression mold cavity and an open position spaced from each other,
    said male mold section including a mold core and a stripper sleeve surrounding said mold core for movement both rotationally and axially of said core,
    a first screw drive coupling said female mold section to said stripper sleeve for rotating said stripper sleeve around said mold core as said at least one mold section is moved between said open and closed positions, and
    a second screw drive coupling said stripper sleeve to said support to move said stripper sleeve axially over said mold core as said stripper sleeve is rotated around said core,
    so that said stripper sleeve rotationally and axially removes a closure molded around said male mold core as said at least one mold section is moved with respect to the other toward said open position.

2. The machine set forth in claim 1 wherein said first screw drive includes a lost motion coupling to allow said mold sections to clear each other before rotating said stripper sleeve around said core.

3. The machine set forth in claim 2 wherein said first screw drive coupling includes: a ball screw including a ball screw shaft and a ball screw nut, a ball screw driver operatively coupling said ball screw nut to said female mold section, a drive gear on said ball screw shaft, and gear teeth on said stripper sleeve engaged with said drive gear.

4. The machine set forth in claim 3 wherein said gear teeth on said stripper sleeve are axially elongated to allow axial motion of said stripper sleeve with respect to said drive gear.

5. The machine set forth in claim 3 wherein said lost motion coupling is operatively disposed between said ball screw driver and said female mold section.

6. The machine set forth in claim 5 wherein said lost motion coupling includes: a support on which said female mold section is mounted, a slot in said support, a ball in said slot, and a detent pocket in said ball screw drive, said ball being disposed in said slot in said closed position of said mold sections and being cammed into said detent pocket in said ball screw drive as said at least one mold section moves toward said open position.

7. The machine set forth in claim 2 wherein said second screw drive includes a threaded coupling between said stripper sleeve and said support.

8. The machine set forth in claim 1 wherein said female mold section is mounted for movement on said support between said open and closed positions.

9. The machine set forth in claim 1 wherein said support is disposed for rotation around a horizontal axis, and wherein said male mold sections and said female mold sections of each mold are aligned along axes perpendicular to said horizontal axis.

10. The machine set forth in claim 8 wherein said female mold sections are disposed radially outwardly of said male mold sections in each of said molds.

11. A machine for compression molding plastic closures, which includes:
    a support for rotation around a horizontal axis,
    a plurality of compression molds on said support at angularly spaced positions around said axis,
    each of said molds including a male mold section and a female mold section aligned along an axis perpendicular to said horizontal axis,
    a cam disposed adjacent to said support to move at least one of said mold sections of each mold with respect to the other mold section between a closed position forming a compression mold cavity and an open position spaced from each other,
    said male mold section including a mold core and stripper sleeve surrounding said mold core for movement both rotationally and axially of said mold core,
    a first screw drive coupling said female mold section to said stripper sleeve for rotating said stripper sleeve around said mold core as said at least one mold section is moved between said open and closed positions, and
    a second screw drive coupling said stripper sleeve to said support to move said stripper sleeve axially over said mold core as said stripper sleeve is rotated around said core,
    so that said stripper sleeve rotationally and axially removes a closure molded around said male mold core as said at least one mold section is moved with respect to the other mold section toward said open position.

12. The machine set forth in claim 11 wherein said female mold sections are disposed radially outwardly of said male mold sections and are movably mounted on said support for movement by said cam between said closed and open positions with respect to said male mold section.

13. The machine set forth in claim 12 wherein said first screw drive includes: a ball screw including a ball screw shaft and a ball screw nut, a ball screw driver operatively coupling said ball screw nut to said female mold section, a drive gear on said ball screw shaft, and gear teeth on said stripper sleeve engaged with said drive gear.

14. The machine set forth in claim 13 wherein said gear teeth on said stripper sleeve are axially elongated to allow axial motion of said stripper sleeve with respect to said drive gear.

15. The machine set forth in claim 13 wherein said first screw drive includes a lost motion coupling to allow said mold sections to clear each other before rotating said stripper sleeve around said core.

16. The machine set forth in claim 15 wherein said lost motion coupling is operatively disposed between said ball screw driver and said female mold section.

17. The machine set forth in claim 16 wherein said lost motion coupling includes: a support on which said female mold section is mounted, a slot in said support, a ball in said slot, and a detent pocket in said ball screw driver, said ball being disposed in said slot in said closed position of said mold sections and being cammed into said detent pocket in said ball screw drive as said at least one mold section moves toward said open position.

18. The machine set forth in claim 11 wherein said second screw drive includes a threaded coupling between said stripper sleeve and said support.

* * * * *